Figure 1:
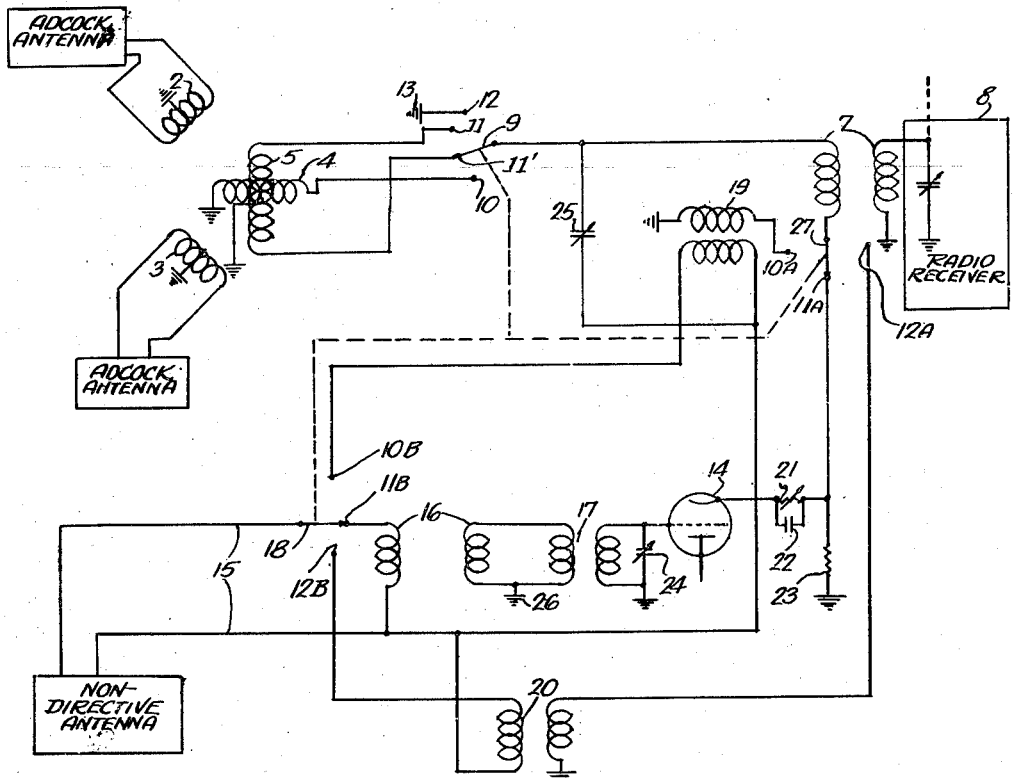

Oct. 25, 1949.					E. MARTINI					2,485,619
					DIRECTION-RESPONSIVE RECEIVER
Filed Aug. 17, 1946										2 Sheets-Sheet 1

INVENTOR
EDOUARD MARTINI
BY
ATTORNEY

Patented Oct. 25, 1949

2,485,619

UNITED STATES PATENT OFFICE 2,485,619

DIRECTION-RESPONSIVE RECEIVER

Edouard Martini, Boulogne-Billancourt, France, assignor to International Standard Electric Corporation, New York, N. Y., a corporation of Delaware Application August 17, 1946, Serial No. 691,238
In France November 29, 1941

Section 1, Public Law 690, August 8, 1946
Patent expires November 29, 1961

11 Claims. (Cl. 343—119)

1

The invention relates to instruments sensitive to the direction of propagation of electromagnetic waves and particularly to those instruments which make use of a rotary receiving array, which can be oriented in order to obtain null reception of the transmitter to be located and to obtain the direction of propagation of the transmissions. In addition to eliminating the 180° sense uncertainty (ambiguity) in the bearings, a non-directive array (vertical antenna) is used, in conjunction with the direction circuit, in order to modify the reception pattern and make it unilateral.

A particular object of the invention is to provide instruments of the type mentioned which lend themselves to more efficient operation and to provide a great measure of independence between the conditions of observation and bearing taking, as well as greater accuracy and facility of operation when actually taking bearings.

Another object of the invention is the provision of variometer finder circuits or connections of the antennas to a radio receiver so contrived that the bearings obtained be precise over a wide frequency band at reception, even at the high frequencies and for the ambiguity elimination to be improved and observation made totally independent from the directivity which is inherent in directive pattern collector arrays.

Another object of the invention is a provision for eliminating the 180° sense uncertainty or ambiguity in the bearing, by a non-directive vertical antenna (which in practice is mounted in the central part of the directive collector array) and to inject the voltage coming from this vertical antenna into the bearing taking circuit in order to modify the reception pattern and make it unilateral.

Another object of the invention is the provision of a means for connecting the non-directive antenna to the radio receiver and for continuous observation of the transmissions without taking any bearings.

A still further object of the invention provides for the establishment of a loose coupling between the cable coming from the non-directive antenna and the ambiguity eliminating circuit, by means of an aperiodic transformer.

Another object of the invention is the provision of an ambiguity eliminating tube inserted between the non-directive antenna circuit and the directive antenna circuit in such manner as to act as an impedance transformer, thus eliminating any irregular variations between the two circuits.

A further object of the invention is the provision of a loosely coupled transformer inserted

2 into the circuit of the vertical antenna and coupled to the input of the radio receiver, through a switch arrangement, in such a way as to act as a "stand-by" circuit for the receiver.

A further object of the invention is the provision of a capacitor inserted between the directive and non-directive circuits in such manner as to neutralize the parasitic coupling effects at the high frequencies.

Figure 2:
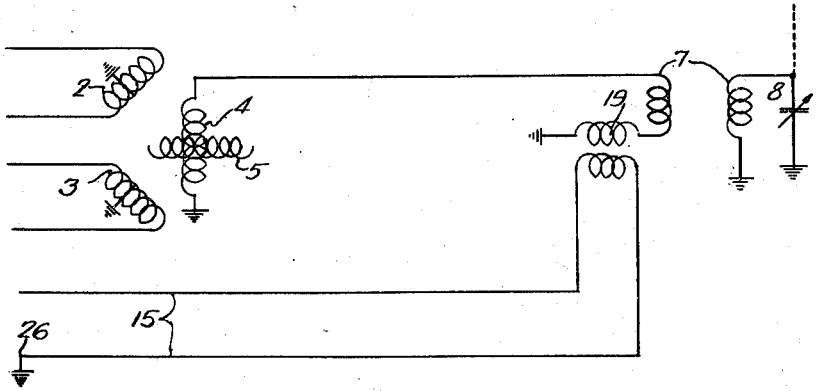
Figure 4:
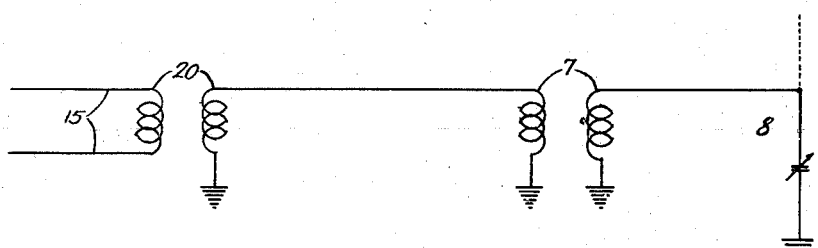
Figure 3:
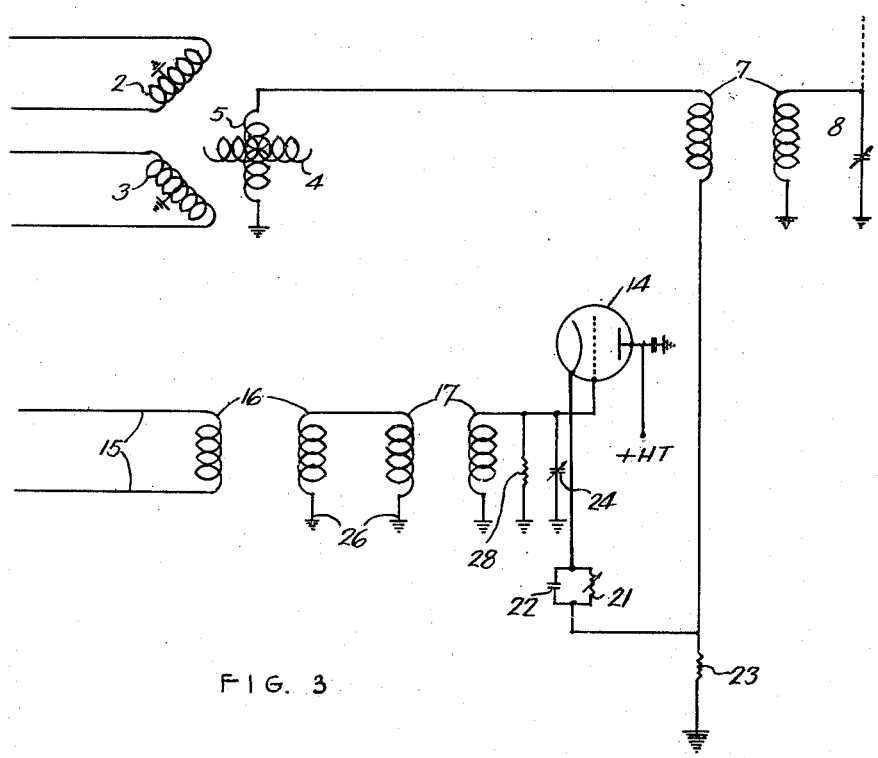

Other and further objects will become apparent from a reading of the following specification and claims taken in conjunction with the drawings, in which:

In the drawings:

Fig. 1 is a schematic diagram embodying some of the characteristics of the invention, for circuits of the directive antennae arrays and vertical antenna in a radio direction finder receiver, Fig. 2 is a schematic diagram of that part of the circuit used for direction finding, Fig. 3 is a schematic diagram of that part of the circuit used for "sensing" (ambiguity elimination), and Fig. 4 is a schematic diagram of that part of the circuit when the device is in the "stand-by" position.

Referring more particularly to the drawings, there is shown, in Figure 1, a schematic diagram of a system using fixed antenna arrays of the Adcock type. A variometer is provided and consists of two fixed rectangular stators 2 and 3, and two crossed rotors 4 and 5. Stators 2 and 3 are respectively connected to two Adcock antenna collector assemblies (not shown) for radio frequency pickup. Rotor 4 is used for direction finding purposes, one of its ends is grounded and the other end connected through contact 10 of switch 9 to the primary of transformer 7, which couples the finder to circuit 8 of a radio receiver. Rotor 5 is used for ambiguity elimination and has its midpoint grounded and its ends connected to contacts 11 and 11' of switch 9.

As is well known, for the purpose of eliminating the 180° ambiguity as to the sense of the indication obtained at the "bearing" taking position, switch 9 is swung alternately onto contacts 11 and 11', in order successively to apply the voltage supplied by rotor 5, with opposite phase, to the input circuit 8 of the receiver. Position 12 of switch 9 places a ground 13 at the receiver input, and, therefore, is the "stand-by" position.

The circuit coming from the vertical or non-directive antenna (not shown) has an ambiguity eliminating tube 14 which is connected to leads 15 of the non-directive antenna through a loosely coupled aperiodic transformer 16 and a tightly coupled tuned transformer 17 by means of contact 11B of a three-way switch 18, capable of taking positions 10B, 11B and 12B, the functions of which are the same as those of the positions having the same numerical references as in switch 9. Position 10B connects the appropriate conductor of cable 15 to an inductive circuit 19, which acts as a compensator and closes the circuit of cable 15 in that position, which is that of "bearing" taking for the whole of the circuit. Position 12B closes the conductors of cable 15 on the primary of a transformer 20 used for "stand-by" purposes.

The contact arms of switches 9 and 18 are mechanically interconnected and also connected to the contact arm of a third switch 27, the three positions of which are designated by reference characters 10A, 11A, and 12A. At position 10A, or "bearing" taking position, switch 27 connects the primary of transformer 7 to the grounded secondary of compensator 19. At position 11A, or ambiguity eliminating position, switch 27 is connected to the lower end of the primary of transformer 7. The ambiguity eliminating circuit of transformer 7 includes tube 14, through a variable resistor 21 and a fixed capacitor 22, which parallels the resistor 21 and is connected to the cathode of tube 14. Another resistor 23 is grounded at one end and has its other end connected to the bottom of the primary of transformer 7 and also to the resistor-capacitor combination 21 and 22. Resistor 23 serves as a bias resistor for tube 14. At position 12A, the switch connects in series the primary and secondary windings of transformer 7 and 20, respectively in order for the set to "stand-by" with the non-directive antenna. The control mechanism for the three rotary switches 9, 18, and 27, which effects the operations necessary for "bearing-taking," ambiguity elimination and "stand-by" is of the conventional type, hence, no embodiment of it will be described.

Tube 14 is connected, as shown, in such a way as to be driven by its grid through the tuned circuit constituted by the secondary winding of transformer 17 and the parallel connected variable capacitor 24, and to have its output circuit at the cathode leads. The tube thus acts as an impedance transformer.

The operation of this circuit will now be described in detail, references being made, in this description, to the explanatory schematic diagrams of Figures 2, 3, and 4 of the drawings. In each one of these figures, only the necessary elements for the corresponding function are shown in the drawings (bearing taking, ambiguity elimination, and standby, respectively) by eliminating switches 9, 18, and 27, which are then in positions 10, 10A and 10B; 11, 11A and 11B; and 12, 12A and 12B, respectively on the diagram of Figure 1.

Referring to Figure 2, when a bearing is taken, since the three switches are at the positions of 10, 10A and 10B respectively, rotor 4 is connected with transformer 7 and is so oriented as to give null or minimal reception of the transmission to be located. The circuit of this rotor then only comprises the primary of transformer 7 and the secondary of compensator 19. The ground indicated at 26, on one of the conductors of cable 15 is common to transformers 16 and 17 and is also shown at 26 in Figure 1 in which case this conductor leads through the primary of transformer 16 (not shown in Figure 2).

The operation of compensator 19, being a conventional part of a direction-finding circuit which applies correction factors for deviation from the true direction, will not be described further.

Referring to the schematic diagram of Figure 3, the drawing shows the circuit of Figure 1 in its "sensing" or ambiguity eliminating position. After having taken a bearing in the position shown in Figure 2, in order to obtain the sense of the directive indication supplied by the bearing, it is necessary to apply a 90 degree phase shift to the current coming from the directive array, which is done by substituting rotor 5 for rotor 4, and to apply at the same time the voltage coming from the vertical antenna to the input circuit 8 of the receiver in a suitable phase relationship as compared to that of the voltage coming from rotor 5.

In order to more successfully define the ambiguity, it is necessary to have, between the voltages coming from rotor 5, and the vertical antenna, an exactly defined phase relationship. More specifically, these voltages must always be rigorously in phase. To this end, and according to some characteristics of the invention, the invention provides the following arrangement in the circuit of the vertical antenna: cable 15, which brings in the voltages of the vertical antenna, and a loose coupling connected with the circuit of the ambiguity eliminating device.

This loose coupling can be obtained in various ways, but in the embodiment shown it consists of a transformer 16 having a loose coupling between its primary and secondary coils.

Transformer 16 has a quadruple role in this invention. First, in the non-directive input circuit it is equivalent or stands for the variometer of the directive input circuit which always introduces a certain phase shift in the chain of circuits of the directive antenna arrays. Secondly, it serves as an ending for cable 15 having an impedance which is as identical as possible to that of a variometer stator. Thirdly, it uncouples the tuning circuit for ambiguity elimination and makes this circuit independent of the length of cable 15. Fourthly, it causes a very definite 90 degree rotation of the voltage coming from the vertical antenna as between the pure resistive value of the tuning circuit for ambiguity elimination, when tuned, and the pure inductive value of the end impedance of cable 15.

Since the tuning circuit of the ambiguity eliminating stage must follow with great precision the voltage variations in the vertical antenna, the loosely coupled transformer 16 is followed by a closely coupled tuned transformer 17. Moreover, at 28, is shown a resistor having a value suitable to damper the tuning circuit and consists of the secondary winding of transformer 17 and the variable capacitor 24 in order to eliminate the risk of a possible lack of tuning, because the 90 degree phase shift is obtained only if the tuning is flawless.

The ambiguity eliminating stage consists, according to one characteristic of the invention, of tube 14 connected as an impedance transformer; that is, having its output circuit inserted into its cathode connection. On the output of tube 14, the voltage coming from the vertical antenna is in opposition of phase with that introduced by variometer rotor 5 through the switch 9. If the connection direction is adequately chosen at positions 11 or 6 of switch 9 in the tuned circuit, no phase rotation or shift other than that sought could take place. If a phase shift took place in the loosely coupled transformer 16, it would be compensated for by the variometer. No phase shift can take place in the primary tuning circuit of finder transformer 7, in spite of the presence of an inductor and a resistor in series, because no current flows in the circuit.

In series in the cathode connection of tube 14 is inserted a resistor 21 shunted by a capacitor 22. This resistor is variable and serves to adjust the amplitude of the voltage coming from the ambiguity elimination stage by modifying the curve of tube 14 and breaking up the radio frequency cathode voltage.

Referring to Figure 4, a schematic diagram is shown embodying that part of Figure 1 which makes up the "standby" circuit and switches 9, 18 and 27 are in positions 12, 12A and 12B. As shown, the voltages brought in by cable 15 of the vertical antenna are transformed by means of a small coupling transformer 20 to tuned transformer 7 of the receiver input circuit. It will be thus seen that "standby" is totally independent of the directive system of the instrument variometer, compensator, and ambiguity eliminating circuit. The use of the loosely coupled transformer 20 is to maintain, as much as possible, the tuning of the input circuit 8 of the receiver. The characteristics of this transformer then simulate those of the variometer.

Referring to Figure 1, when the instrument has been designed to operate at high frequencies of the order of one megacycle and above, trouble has been observed, in some instances, due to the radio frequency coupling between the non-directional antenna and the finder circuit. These radio frequency couplings are due mostly to the capacitance of the key of the three switches 9, 18, and 27. They may cause substantial irregular variations in the operation of compensator 19 and of the ambiguity elimination circuit. These variations are evidenced by a current transfer from the circuit of the non-directional antenna to the circuit of the movable finder when tube 14 is at rest and the non-directional antenna is the only one excited, the switches being at positions 11, 11A and 11B for ambiguity elimination. In order to obviate this drawback, the invention provides a neutralizing capacitor 25 between the ambiguity eliminating and finder circuits. The adjustment of this capacitor cancels the current transfer and thus eliminates the irregular variations in these circuits at the high frequencies.

It is clear that the invention is by no means limited to the example described above, but that, on the contrary, it lends itself to a number of modifications and adaptations, without thereby exceeding its field of applications, separately or in combination, in radio direction finder receivers using other antennae arrays or directive finders.

What is claimed as new and desired to be secured by Letters Patent of the United States, is:

1. In an instrument sensitive to the direction of propagation of electromagnetic waves, a combination consisting of an Adcock antenna array, a non-directional antenna, means for eliminating ambiguity, said means comprising a circuit including a variable-mu tube, a transformer, a biased resistor, a variable resistor, a fixed capacitor shunting the variable resistor and a tuned circuit connected to the input of the tube, and means for inserting the incoming signal voltages from both antenna systems to the input of a radio receiver.

2. In an instrument sensitive to the direction of propagation of electromagnetic waves, a combination consisting of an Adcock antenna array, a non-directional antenna, means for eliminating ambiguity, said means comprising a circuit including a variable-mu tube, a transformer, a biased resistor, a variable resistor, a fixed capacitor shunting the variable resistor and a tuned circuit connected to the input of the tube, and means for inserting the incoming signal voltages from both antenna systems to the input of a radio receiver, said means consisting of a radio frequency transformer having one side of the primary coil connected to the Adcock antenna array and the other side connected to the output of the ambiguity elimination circuit.

3. In an instrument sensitive to the direction of propagation of electromagnetic waves, a combination consisting of an Adcock antenna array, a non-directional antenna, means for eliminating ambiguity, said means comprising a circuit including a variable-mu tube, a transformer, a biased resistor, a variable resistor, a fixed capacitor shunting the variable resistor and a tuned circuit connected to the input of the tube, and means for inserting the incoming signal voltages from both antenna systems to the input of a radio receiver, said means consisting of a radio frequency transformer having one side of the primary coil connected to the Adcock antenna array and the other side connected to the output of the ambiguity elimination circuit and the secondary coil connected to the input of a radio receiver.

4. In a device of the class described, an ambiguity eliminating circuit including a variable-mu tube, a variable resistor connected in series with the cathode of the tube and a fixed capacitor shunted across the resistor, a direction-finding circuit including a variometer, a receiver standby circuit and means for selectively connecting the circuits to the input of a radio receiver.

5. In a device of the class described, an ambiguity eliminating circuit including a variable-mu tube, a variable resistor connected in series with the cathode of the tube and a fixed capacitor shunted across the resistor, a direction-finding circuit including a variometer, a receiver standby circuit, and means for selectively connecting the circuits to the input of a radio receiver, said means comprising a series of switches for simultaneous operation.

6. In a device of the class described, an ambiguity eliminating circuit including a variable-mu tube, a variable resistor connected in series with the cathode of the tube and a fixed capacitor shunted across the resistor, a direction-finding circuit including a variometer, a receiver standby circuit, and means for selectively connecting the circuits to the input of a radio receiver, said means comprising a series of rotary switches for simultaneous operation.

7. In a device of the class described, an ambiguity eliminating circuit including a variable-mu tube, a variable resistor connected in series with the cathode of the tube and a fixed capacitor shunted across the resistor, a direction-finding circuit including a variometer, a receiver standby circuit, a variable capacitor connected to the first two-mentioned circuits and means for selectively connecting the circuits to the input of a radio receiver.

8. In a device of the class described, an ambiguity eliminating circuit including a variable-mu tube, a variable resistor connected in series with the cathode of the tube and a fixed capacitor shunted across the resistor, a direction-finding circuit including a variometer, a receiver standby circuit, a variable capacitor connected to the first two-mentioned circuits, and means for selectively connecting the circuits to the input of a radio receiver, said means comprising a series of swtiches for simultaneous operation.

9. In a device of the class described, an ambiguity eliminating circuit including a variable-mu tube, a variable resistor connected in series with the cathode of the tube and a fixed capacitor shunted across the resistor, a direction-finding circuit including a variometer, a receiver standby circuit, a variable capacitor connected to the first two-mentioned circuits, and means for selectively connecting the circuits to the input of a radio receiver, said means comprising a series of rotary switches for simultaneous operation.

10. A direction finder having a directive antenna system and an ambiguity removing antenna system and a receiver, said directive antenna system comprising a variable coupling circuit, switching means for coupling either the directive antenna system alone or both of said antenna systems to said receiver, a switching device for coupling said ambiguity antenna system alone to said receiver for survey purposes and a coupling for said directive antenna system in this latter connection having the same coupling characteristics as said variable coupling circuit.

11. An arrangement according to claim 10, wherein said coupling for said directive antenna system in this latter connection comprises a loosely coupled transformer.

EDOUARD MARTINI.

REFERENCES CITED

The following references are of record in the file of this patent:

UNITED STATES PATENTS

| Number | Name | Date |
|---|---|---|
| 2,702,440 | Hinton | Feb. 19, 1929 |
| 2,110,858 | Blodgett | Mar. 15, 1938 |
| 2,171,432 | Hicks | Aug. 29, 1939 |
| 2,426,175 | Busignies | Aug. 26, 1947 |